United States Patent [19]

Sekiguchi

[11] Patent Number: 5,197,886

[45] Date of Patent: Mar. 30, 1993

[54] PROCESS AND DISPLAY WITH MOVEABLE IMAGES

[76] Inventor: Yoshi Sekiguchi, 437 Marshman, Highland Park, Ill. 60035

[21] Appl. No.: 815,420

[22] Filed: Dec. 31, 1991

Related U.S. Application Data

[62] Division of Ser. No. 447,064, Dec. 7, 1989, Pat. No. 5,098,302.

[51] Int. Cl.$^5$ ............................................. G09B 19/00
[52] U.S. Cl. ...................................... 434/365; 434/81; 434/90; 40/446; 40/453
[58] Field of Search ..................... 434/365, 81, 90, 96, 434/97, 428; 40/427, 446, 453, 454, 436, 437, 442, 487, 488, 362

[56] References Cited

U.S. PATENT DOCUMENTS

| | | | |
|---|---|---|---|
| 4,040,353 | 8/1977 | Lefebvre | 40/453 X |
| 4,263,737 | 4/1981 | Simon | 40/453 |
| 4,897,802 | 1/1990 | Atkinson et al. | 40/362 |

Primary Examiner—Richard J. Apley
Assistant Examiner—Glenn E. Richman
Attorney, Agent, or Firm—Thomas W. Tolpin

[57] ABSTRACT

An efficient economical process is provided to produce an intricate impressive display with outstanding marketing and advertising appeal. In the process, a grid and multiple images are formed, such as on a central processing unit, the images are masked and striped, and portions thereof are superimposed. The grid can be printed on a front web. The superimposed masked images can be printed on an underlying back web. The display produced by the special process can be used to form an attractive sign, billboard, educational game, toy, box, wrapper and other packaging.

4 Claims, 10 Drawing Sheets

PROCESS AND DISPLAY WITH MOVEABLE IMAGES

This is a division of application Ser. No. 07/447,064, filed Dec. 7, 1989, now U.S. Pat. No. 5,098,302.

BACKGROUND OF THE INVENTION

This invention pertains to displays and, more particularly, to advertising and educational displays.

Conventional print advertising and packaging is accomplished by printing stationary non-moveable information and pictures on magazines, newspapers, brochures, flyers, posters, billboards, signs, wrapper, boxes, etc. While many conventional print advertisement and packages (trade dress) are interesting, most are not. A primary purpose of a good advertisement and trade dress (package) is to attract the attention of the reader (customer) and convey the desired information. Unfortunately, many print advertisements and packages do not attract the attention of customers.

In an effort to attract the customer's attention, various types of electrical signs have been installed, such as illuminated signs, including neon signs, billboard illuminated with flood lights and spot lights, marquees with moving messages, blinking lights, etc. Electrical signs, however, are often very costly, bulky, and difficult to repair. Electrical signs are also not practical for packages, magazines, newspapers, etc. nor for educational games for small children.

Over the years, many types of toys and gadgets have been developed or suggested with moveable, non-electrical powered pictures, such as: kaleidoscopes, zoetropes, praxinoscopes, kinetoscopes, viewmaster devices with rotating discs, manual and crankable flip cards, laminated plastic key chains, and sheets with moveable overlays to illustrate rotating wheels and smoke billowing from locomotives. Many of the toys and gadgets are interesting but are not useful in billboards, signs, educational games, wrappers, boxes and other packages.

It is, therefore, desirable to provide an improved display which overcomes most, if not all, of the preceding problems.

SUMMARY OF THE INVENTION

An improved process is provided for producing an attractive, aesthetic display with superb marketing and advertising appeal. Advantageously, the novel process is efficient, effective, and economical. Desirably, the high quality display is easy-to-use, impressive to view and pleasing to see and readily and accurately conveys the information being displayed. The display can also feature moveable messages and high quality images which move without the need and cost of expensive electrical equipment.

To this end, the process comprises generating an overlying grid-like pattern (grid) and at least two images (objects) with a computer or other central processing unit (CPU). The first image can be produced either creating original illustration/design or other graphic elements or by optically scanning or electronically reading the desired image (indicia) from a photograph, magazine, brochure, document, or other media and transmitting the image to a monitor or display screen of the CPU. The second image can be generated by electronically copying and subsequently altering and modifying the first image on the monitor. At least one and preferably all the images are then masked, electrically revised and striped on the CPU by sequentially moving and overlaying the grid on the images and thereafter electronically removing erasing, canceling, or otherwise deleting a symmetrical pattern of spaces on the images to form masked images with a spaced array of stripes comprising viewable opaque portions with spaces positioned between and separating the stripes.

After masking, part or all of the portions of the masked images are overlayed, superimposed, and combined upon each other in offset relationship so that the viewable stripes of one image are positioned in the spaces (spacer portions) of another image. The grid can be printed on a front web, preferably initially on a plastic sheet of film, to provide an overlay (grid overlay), mask, and screen. The superimposed images or illustrations are printed on an underlying web or rearward web, such as on coated backing paper, which when installed in the display, is positioned behind the first front web. If desired, the web or grid can be made of other materials, such as wood, metal, glass, composites, paper, paperboard, or cardboard, preferably or substantially planar or flat, flexible sheets.

The grid has a special arrangement of transparent void spaces which provide a series of windows to view one of the viewable portions of one of the images while the other images are blocked from view by opaque bars (rules) between the windows. One or both of the webs can be moved in a longitudinal, lateral, lateral, and/or arcuate direction or can pivot. The images also can be printed in back an white or in different colors, if desired. The images can be words, letters, photographs, pictures, portraits, or be of different configurations and designs and can have indicia thereon, if desired. The stripes of the images can have a lesser or greater spacing or thickness than the bars of the grid to attain reverse or concurrent movement in the direction of the front web (grid) or underlying (back) web.

One or both webs can also be stationary, such as for use in a sign or billboard. The sign or billboard has a frame surrounding and secured to the webs and posts, columns, stands, hooks or wall fasteners to elevate the frame above the floor or ground. Desirably, the images change or move in the sign when the observer moves.

The display can also be in the form of an educational game and toy with a housing to peripherally enclose a stationary front webs (grid). The rearward web can comprise a scroll connected to cylindrical roller which are rotated by knobs, cranks, handles, or other manually grippable controls. The game can further be constructed to receive interchangeable cassette or cartridges containing one or both of the webs and different images thereon. The images change or move when the scroll is rotated clockwise or counterclockwise. In some circumstances, it may also be desirable to have an educational game and toy with a moveable front web.

The display can also be in the form of a package, such as for a candy bar wrapper or box of candy. The novel package has a cover which comprises a transparent outer sleeve. The transparent sleeve partially encloses and slides upon the wrapper or box. In the package, the top of the wrapper or box comprises the rearward web. The top of the cover comprises the front web. When the cover is slid off or moved along the box or wrapper, the images change or move.

The display can further comprise a rotatable display with a stationary front web having a radial grid and a rotatable disc or wheel providing a rotatable rearward web with radial superimposed images thereon. In some circumstances, it may be desirable that the front web comprise a rotatable disc or wheel while the rearward web can be stationary.

If desired, the display can also be used as part of the cover or inside of a book. The display also can be used in or form part of other articles of manufacture and are useful to display advertising, marketing, promotional, educational, government, and safety material, messages, and other information.

As used in this Patent Application, the term "striping" means forming an image with substantially parallel stripes.

The term "striped" as used in this Patent Application, means an image comprising substantially parallel stripes, radial stripes, or dotted lines.

The term "superimposed" as used in this Patent Application, means that portions of the images are combined and placed upon each other.

The terms "image" and "images" as used in this Patent Application mean printed, painted, or written information, photographs, pictures, illustrations, designs, symbols, objects, words, and/or letters.

A more detailed explanation of the invention is provided in the following description and claims taken in conjunction with the accompanying drawings.

DETAILED DESCRIPTION OF THE PREFERRED EMBODIMENTS

An efficient accurate timesaving process is provided to produce an attractive quality display 100-118 of FIGS. 2-40 with moveable images 120-154 providing a graphic display device and assembly comprising moveable pictures, words, letters, symbols, designs, or other indicia or information. In the process an overlying grid-like pattern 160-176 providing a grid and at least two images 120-154, including intermediate, unscreened, unmasked, non-striped (unstriped), substantially solid images, generated, electrically created, produced, and formed on a central processing unit (CPU) 200 (FIG. 1) comprising a computer 202 and displayed, projected, and viewed on a monitor 204 comprising a screen of the central processing unit 200. The grids (grid-like patterns) and images illustrated in the drawings of this patent application, as well as other grids and images, were generated on an Apple MacIntosh (Mac II) computer with Adobe Illustrator 88 1.9.3 software. Other computers and art and graphic software, such as Aldus FreeHand software, can be used, if desired.

Figure 22:
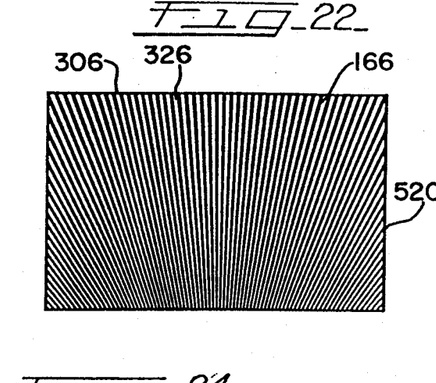
FIG. 22 illustrates a front web (overlay) comprising a radial grid.
Figure 23:
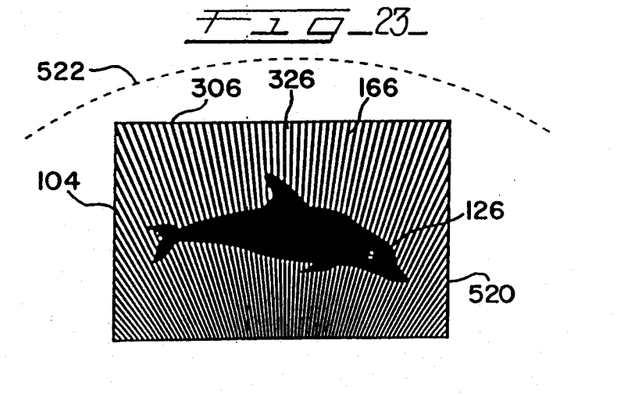
FIG. 23 illustrates the radial grid of FIG. 22 placed over the superimposed (combined) dolphin images so as to only display the first image, and showing in dotted line part of the rear wheel comprising the rearward web.
Figure 24:
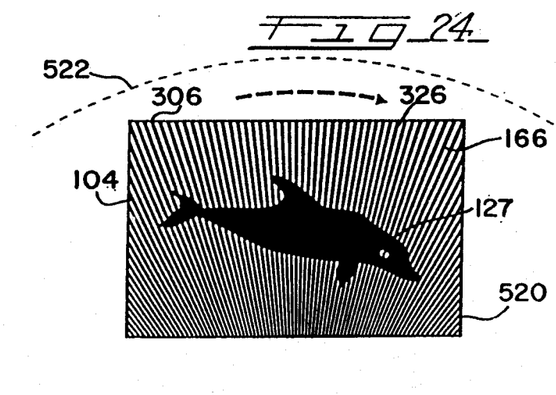
FIG. 24 illustrates the radial grid placed over the superimposed (combined) dolphin images so as to only display the second image, and showing in dotted line part of the rear wheel comprising the rearward web.

The grid (grid-like pattern) 160-176 comprises a matrix and mask with a set, series, and array of aliquot evenly spaced, uniform, elongated opaque bars 300-316 comprising stripes or rules and a set, series, and array of aliquot, evenly spaced, uniform slit-like void spaces or slits providing elongated windows 320–336 or striped slit-like port holes between the bars. Preferably, all the bars in a grid have the same thickness, are uniformly spaced from each other, and have a similar shape and size. The bars can comprise radial bars 306 with radial portions that extend radially as shown in FIGS. 22–24, or can comprise curved bars with curved arcuate portions, or can comprise horizontal bars, diagonal bars, or preferably vertical bars 300–304 and 308–316 with parallel, straight vertical striped portions. Desirably, all the windows in a grid have a similar size and shape. The size, shape, and spacing of the grid can be modified by the operator or designer via the control keys (buttons) 206 (FIG. 1) of the computer.

When the mask (grid) is generated on the CPU with an Adobe Illustrator 88 1.9.3 software program, the ends of the bars can be connected outside of the area which is used to mask and cover the underlying images; the mask appears in black and white when the program is in an artwork and template mode; and the mask appears transparent when the program is in the preview illustration mode, such as during masking and to preview superimposed (combined) images preparatory to printing.

The first intermediate, unscreened, unmasked, non-striped (unstriped), image can be created, originated, and generated by the designer on the computer 202 and monitor 204, or can be produced by initially optically scanning and electrically reading the desired image 400 on an optical scanner 208 (FIG. 1) from a sheet of paper 402, such as from a magazine, newspaper, brochure, etc. During testing, numerous images were scanned on a Dest PC Scan Plus scanner with Publish Pac 1.11 scanning software. Other types of scanners and software scanning programs can be used, if desired.

The scanned image 400 (FIG. 1) is transmitted to the monitor 204 via a cable wire 210 and moved to a position on the screen 204 away from the grid. The first intermediate image can be enlarged and reduced, expanded or contracted, in whole or in part, by the operator or designer via the computer control keys 206 of the CPU 200. The interior portions of the first intermediate image (pattern), which can be bounded and enclosed by the periphery and outline of the image, can be generated and electrically painted in a selected solid color, such as with the Adobe Illustrator 88 1.9.3 software program, if desired, by the operator or designer via the computer control keys 206 of the CPU 200.

Figure 8:
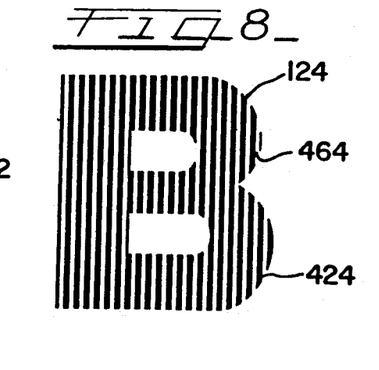
FIG. 8 is a masked image (object) of a B.
Figure 9:
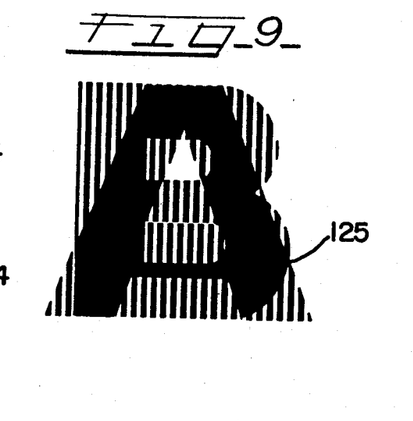
FIG. 9 illustrates superimposed (combined) masked images A and B.
Figure 10:
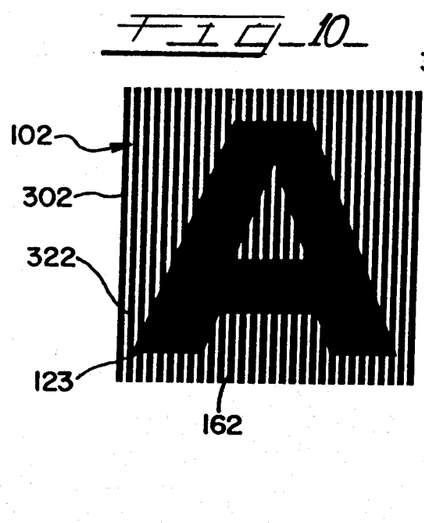
FIG. 10 illustrates a grid placed over the superimposed (combined) masked images A and B so as to only display the first image comprising the letter A.
Figure 11:
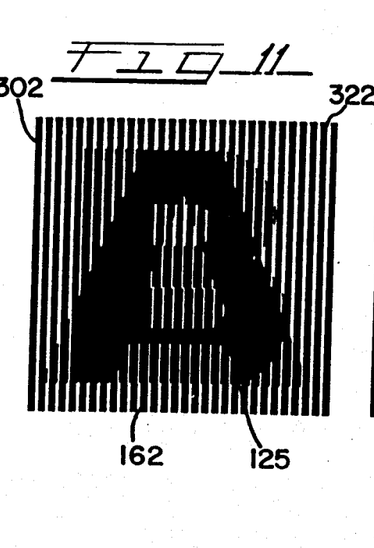
FIG. 11 illustrates the grid moved by half of one grid (bar) unit over the superimposed masked images A and B.
Figure 12:
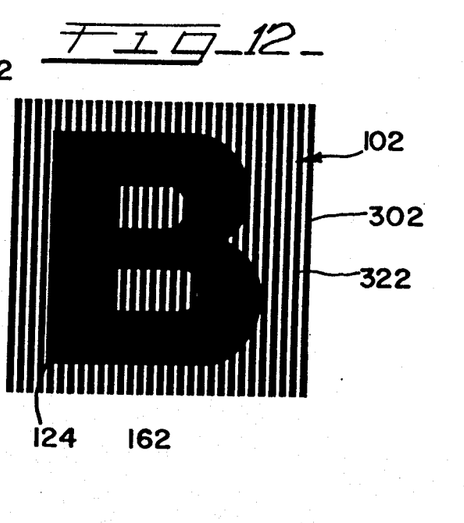
FIG. 12 illustrates the grid placed over the superimposed (combined) masked images A and B so as to only display the second image comprising the letter B.
Figure 13:
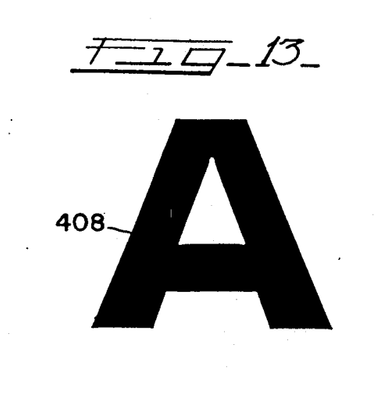
FIG. 13 is an image (object) of an A.
Figure 14:
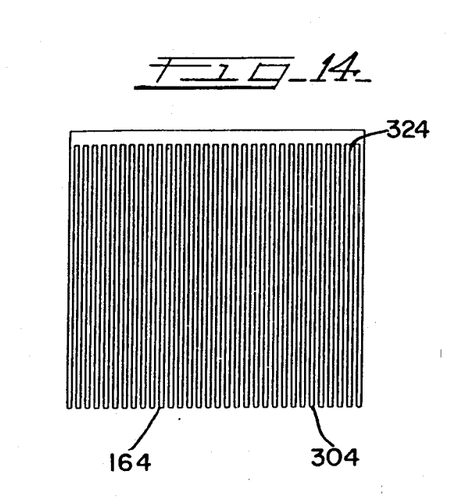
FIG. 14 is a front view of a mask (grid)

The second image can be substantially or entirely different than the first image, such as the second image 124 of FIG. 8. The second intermediate, unscreened, unmasked, non-striped (unstriped) image can be created, originated generated, and produced, in whole or in part, in a manner similar to the method described above for the first intermediate image. Preferably, however, the second intermediate, unscreened, unmasked, non-striped is produced by electrically copying the first intermediate image, such as the first intermediate, unscreened, unmasked, non-striped, solid dolphin image 404 of FIG. 19, to form a copied, duplicate intermediate second image. The second intermediate image can be moved or otherwise placed on the screen 204 of the CPU 200 at a different location than the first intermediate image or vice versa. In some circumstances, it may be desirable that the copied, unmasked, second intermediate image be identical to the first intermediate image and merely positioned at a different location or electrically painted in a different color. It is usually preferred, however, to subsequently alter, revise, and modify at least a part of the overall design, appearance, and shape of the copied intermediate image until the desired intermediate image is attained, such as the revised, second intermediate, unmasked, unscreened, non-striped, solid dolphin image 406 of FIG. 19 with a raised tail and lowered fin, so that a substantial portion of the second intermediate image is different than the first intermediate image. This can be accomplished by the operator or designer via the computer control keys 206 (FIG. 1) of the CPU 200.

Additional intermediate and final images, such as a third image 137 (FIG. 33) and 141 (FIG. 36), fourth image 142 (FIG. 37), etc., can be formed by following a sequence of steps similar to that described above for producing (generating) the second image.

Figure 15:
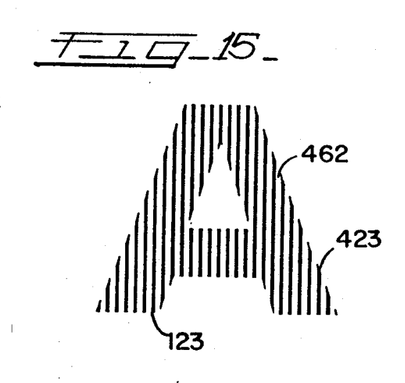
FIG. 15 is a masked image of an A produced by masking the grid of FIG. 14 on the image of FIG. 13.
Figure 16:
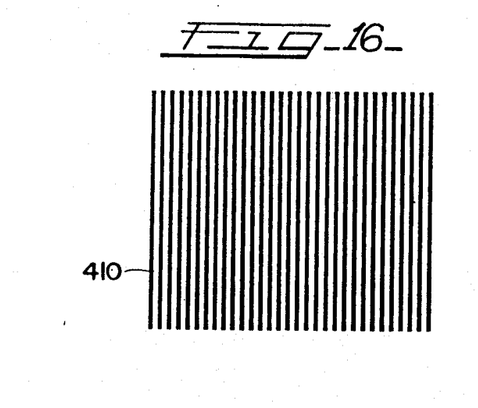
FIG. 16 is an image comprising a grid pattern.
Figure 17:
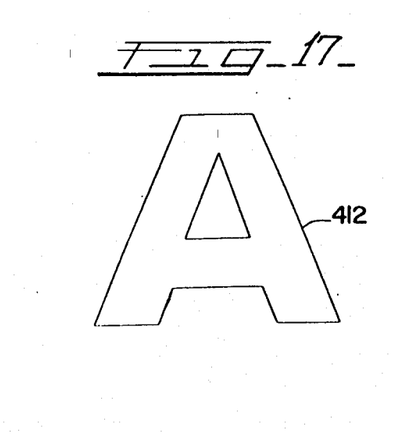
FIG. 17 is a mask of an outline (stencil) of the letter A.

In order to form the final, completed striped images, such as the striped image 123 of FIG. 15, each of the intermediate images are electrically masked, screened, stenciled, and striped. This is accomplished by sequentially moving and overlaying the grid (mask) or duplicate grids, such as the grid 164 of FIG. 14, on the intermediate images, such as the intermediate solid image 408 of FIG. 13, and electrically deleting, erasing, and removing portions of the intermediate image behind the bars 304 (FIG. 14) of the grid 164, via the computer control keys 206 (FIG. 1) of the CPU 200. With the mask (grid) is generated on the CPU with Adobe Illustrator 88 1.9.3 software program, the grid is transparent in the preview illustration mode and need not be moved from the masked image. With other programs, it may be desirable that the grid be returned to its original location or moved to another location on the monitor of the CPU.

Figure 18:
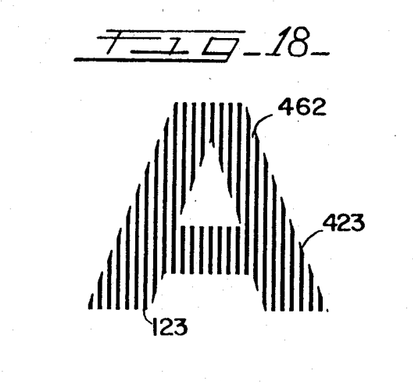
FIG. 18 is a masked image of an A produced by masking the mask of FIG. 17 on the image of FIG. 16.
Figure 19:
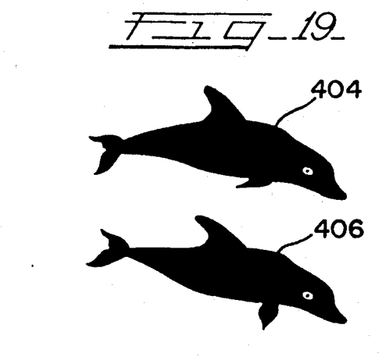
FIG. 19 illustrates two solid intermediate dolphin images.

While the above method is preferred for best results, in some circumstances it may be desirable that the first intermediate image comprise stripes 410 (FIG. 16), that the mask or grid comprise an outline, such or outline 412 (FIG. 17), and that during masking, the exterior extraneous portions of the intermediate striped image 410 (FIG. 16) located outside of the outline 412, be deleted to form the final striped image 423 (FIG. 18).

Each of the completed striped, masked, screened final images has a set, series, and array of aliquot, evenly spaced, uniform stripes 421–454 comprising elongated viewable opaque portions or dotted lines and a set, series, and array of aliquot, evenly spaced, uniform spacer portion or spaces 460–466 between the stripes. Preferably, the stripes of all the images in each display are uniformly spaced from each other and have a similar size and shape. The stripes can comprise radial stripes, such as radial stripes 426 and 427 (FIG. 20) with radial portions that extend radially, as illustrated in the first and second striped, masked, screened, dolphin images 426 and 427 of FIG. 20. The such as 421 and 422 of FIG. 3, or stripes with curved portions, such as 431 and 432 of FIG. 25. Furthermore, the stripes can comprise horizontal stripes, diagonal stripes, or preferable vertical stripes, such as 423 and 424 (FIGS. 7 and 8) with striped portions. Desirably, all the spacer portions between the stripes in an image are of a similar size and shape.

During masking, screening, and striping, the viewable stripes are positioned behind the windows of the grid and the spacer portions are obstructed and blocked from view behind the bars of the grid. The width of the strips generally correspond to the width to the windows of the grid.

Preferably, the images are electrically formed, masked, and striped in accordance with the following formula:

$$B_w = O_w - I_l$$

wherein
- $B_w$ = width of the opaque bars of the grid or grid-like pattern;
- $O_w$ = overall combined width of the stripes of all the images;
- $I_l$ = combined width of the stripes of the first image.

Figures 38, 39:
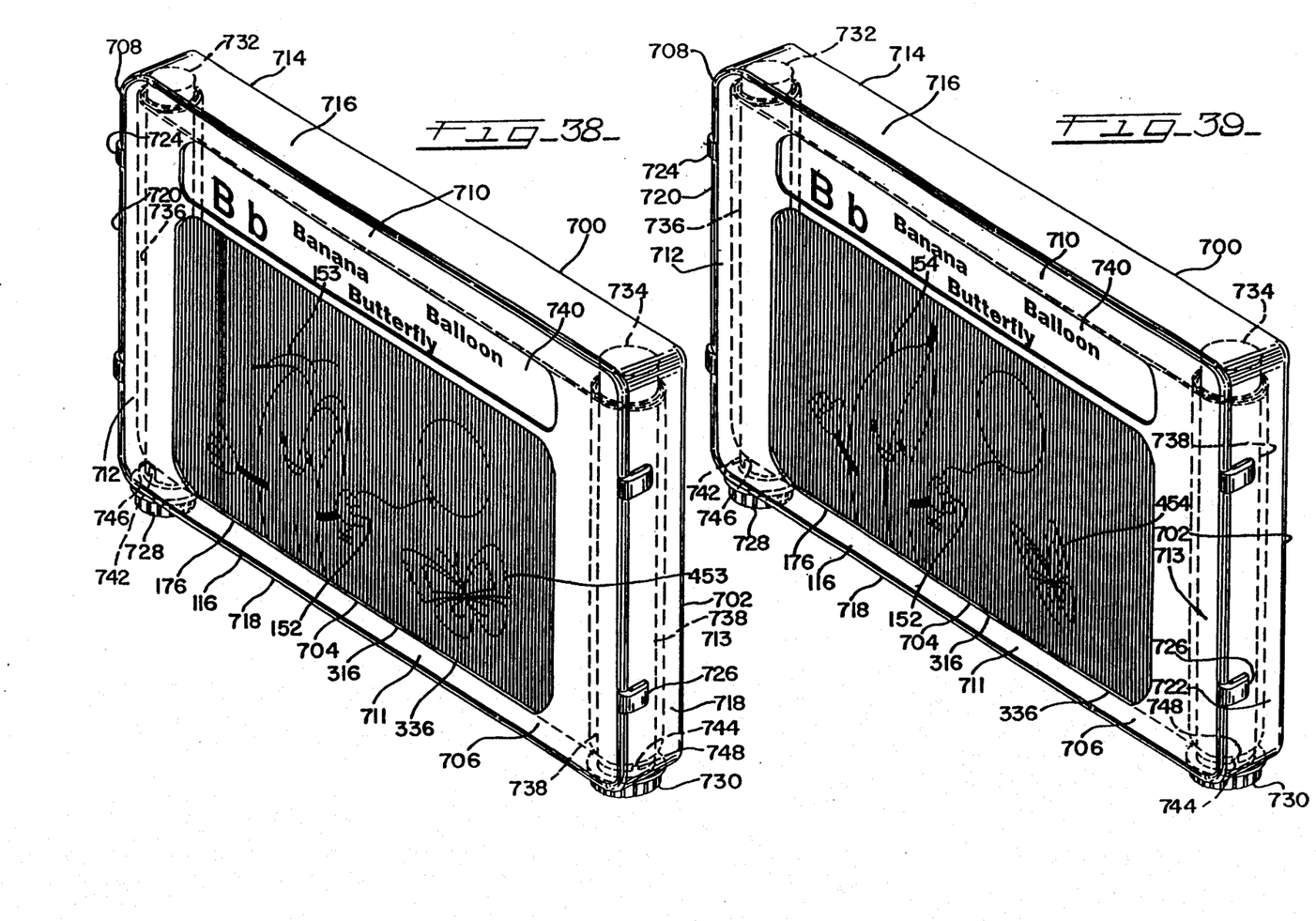
FIG. 38 is a perspective view of an educational display game in accordance with principles of the present invention with the underlying web positioned to only display the first images.
FIG. 39 is a perspective view of the educational display game of FIG. 38 with the underlying web positioned to only display the second images.

After masking and striping, the masked images are moved, superimposed, combined, and aligned in offset relationship to each other, via the computer control keys 206 (FIG. 1) of the CPU 200 so that at least a portion of the stripes of the image are aligned in registration with and superimposed upon part of the spacer portions of the adjacent image(s) and vice versa, such as shown in superimposed images 120 (FIG. 3), 125 (FIG. 9), 128 (FIG. 21), 130 (FIG. 25), and 452 (FIGS. 39 and 39).

The grid can be printed on first elongated front web, preferably a transparent plastic web comprising transparent semi-rigid shape-sustaining portions, to provide an overlay (overlay grid), screen, and mask. The superimposed images (illustrations) can be printed on a second elongated rearward back web, such as on an elongated paper web, a flexible plastic, or some other backing sheet, to provide the underlying illustrations and information. Printing can be accomplished with Linotronic model 300 printer and printed with four color separation on film as a negative or positive. Proofs can be developed with chromaline four piece laminated film or with progressive proofs bonded together or by short run proof printing, and subsequently printed on the desired paper, paperboard, plastic coated paper, or web. The print can be enlarged for billboards with a Mega Print printer. Other types of printers can be used.

The display comrpises the front and rearward webs, which are preferably positioned parallel to each other. When the rearward web is placed behind the front web, the stripes of only one of the images can be viewed through the windows of the grid while the bars of the grid block and obstruct the view of the stripes of the other images, until one of the webs is moved or the observer changes positions and the stripes of another image become viewable through the windows of the grid, etc. creating the illusion of movement. The grid overlay is preferably at least as large as the moveable portions of the superimposed underying images.

Figures 25, 26, 27, 28:
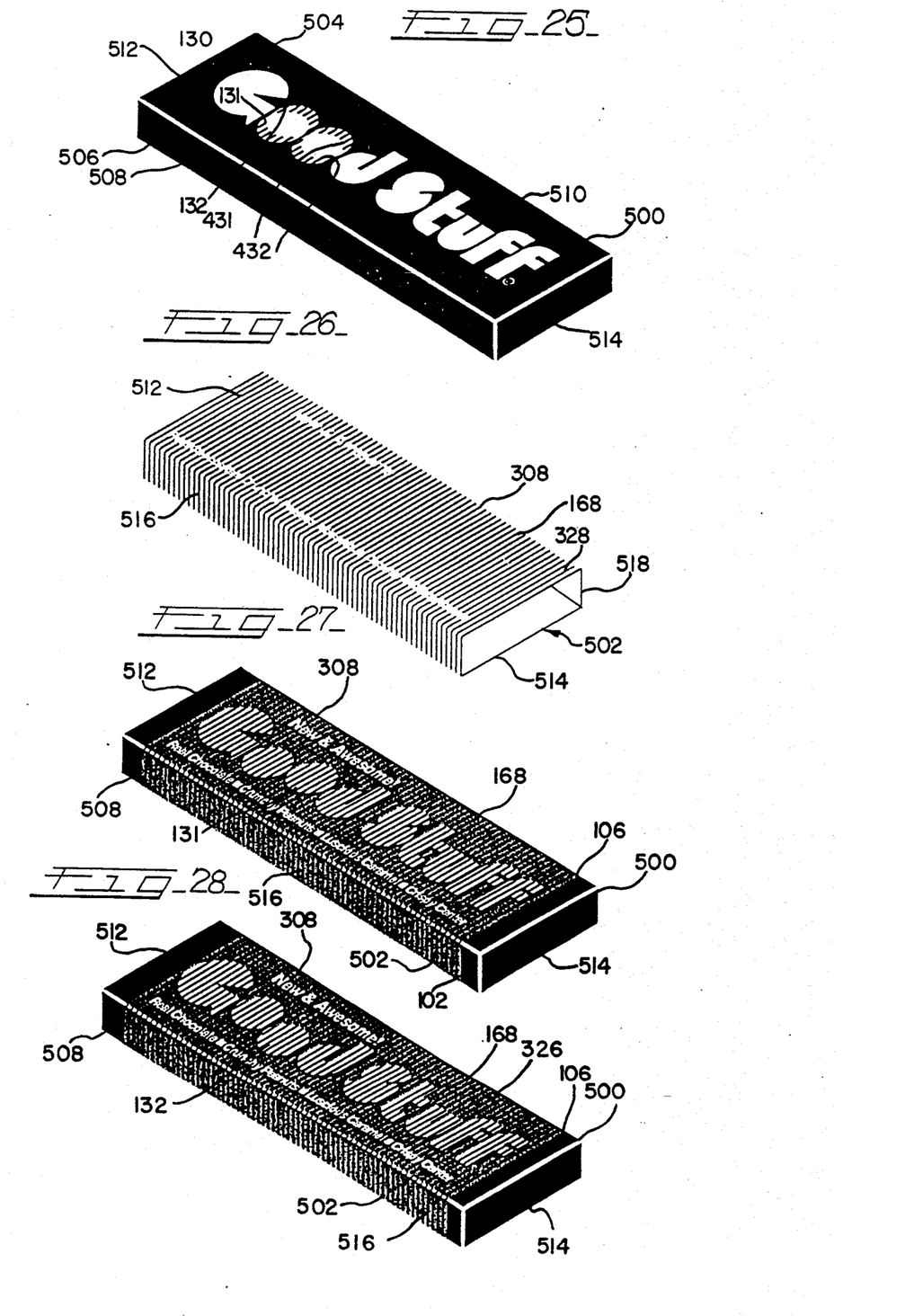
FIG. 25 is a perspective view of a wrapper of a composite candy bar display package in accordance with principles of the present invention.
FIG. 26 is a perspective view of a cover of the composite candy bar display package.
FIG. 27 is a perspective view of the composite candy bar display package with the cover about the wrapper so as to only display the first image.
FIG. 28 is a perspective view of the composite candy bar display package with the cover about the wrapper so as to only display the second image.

For best results for a two image display, the relationship of the width of the bars of the overlay (overlying) grid, the width of the stripes of the superimposed images, and the distance and spacing between the front web (overlay) and the rear web comprising the underlying images, to the focal point of the observer, are in accordance with the following formulas:

$$S = B - D \text{ and}$$

$$A/B = C/D$$

wherein
- $S$ = the spacing (distance) between the front web (overlay) and the rearward web comprising the underlying images
- $B$ = the distance between the rearward web and the focal point (location) of the observer
- $D$ = the distance between the front web (overlay) and the focal point (location) of the observer
- $A$ = maximum width of any stripe of the underlying superimposed images
- $C$ = maximum width of any bar of the grid overlay Therefore, if the overlay (front web) is placed against the rearward web, such as in the illustrated candy bar composite package of FIGS. 27 and 28,, the maximum width of the bars of the grid should be equal to the maximum width of the stripes of the superimposed underlying images. If the overlay (front web) is spaced in front of the rearward web, such as in the illustrated display sign of FIG. 2 and the educational display game of FIGS. 38–40, the maximum width of the bars of the grid can be smaller than the maximum width of the stripes of the superimposed underlying images, to accommodate perspective phenomena.

Figures 31, 32, 33:
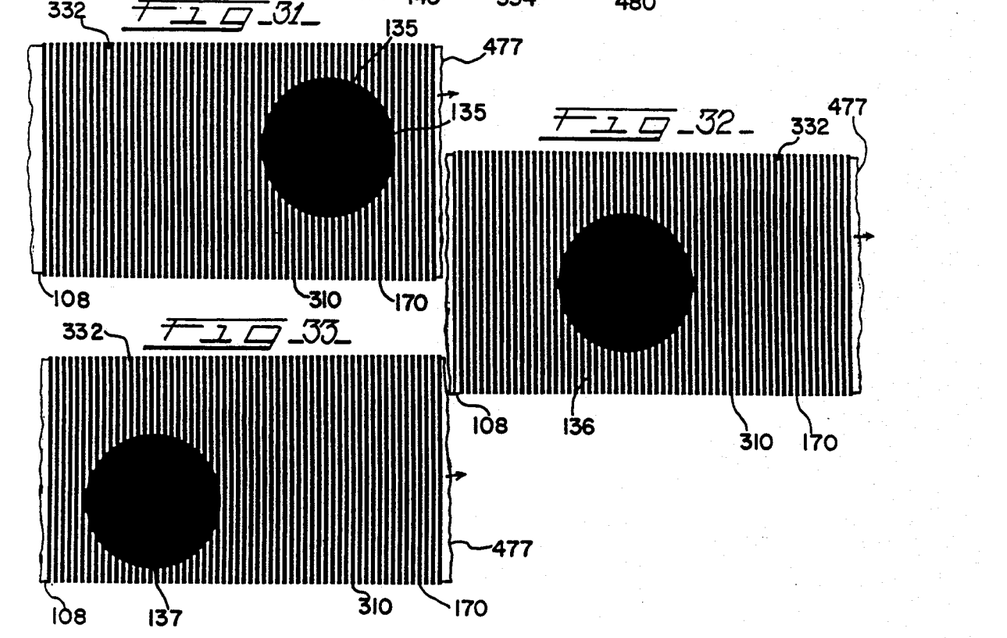
FIGS. 31-33 illustrate a three image display.
Figure 34:
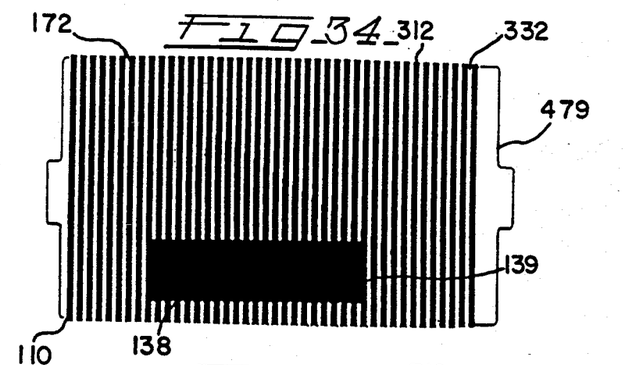
FIGS. 34-37 illustrate a four image display.
Figure 35:
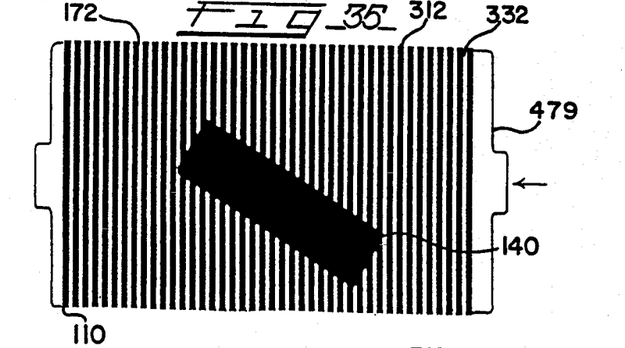
Figure 36:
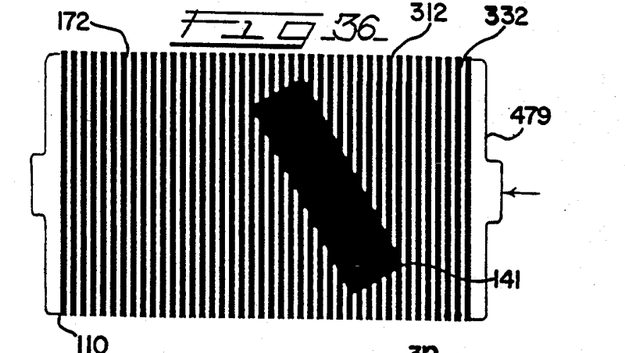
Figure 37:
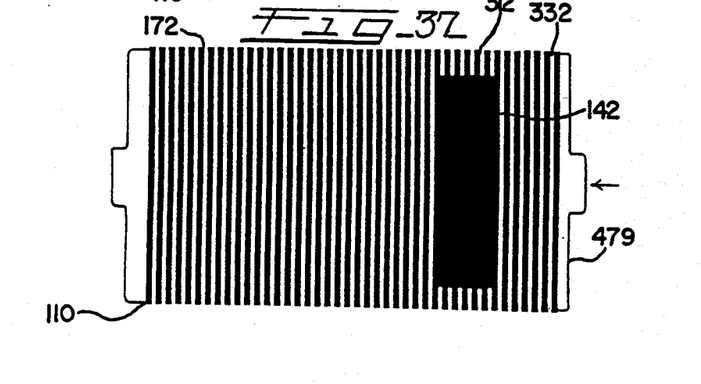

When the overlay (front web) is placed against the rearward web, each bar of the grid is at least as wide as a corresponding stripe of any image in the display. The bars of the grid are each wider than the corresponding stripes of the images in the display when more than two images are depicted in the display. For a two image display, i.e. a display with only two images, such as shown in FIGS. 7–12, each bar 302 of the grid 162 preferably has the same width as any one stripe 423 or 424 of the images 123 and 124. For a three image display, i.e. a display with only three images on a rearward web 477, such as shown in FIGS. 31–33, each bar 310 of the grid 170 has a width about equal to the combined width of two stripes of the images 135–137. The three image display 108 of FIGS. 31–33 has a three step, 6 point rule with three point spaces. For a four image display 110, i.e. a display with only four images on a rearward web 479, such as shown in FIGS. 34–37, each bar 312 of the grid 172 has a width about equal to the combined width of three stripes of the images 139–142, etc.

Figure 29:
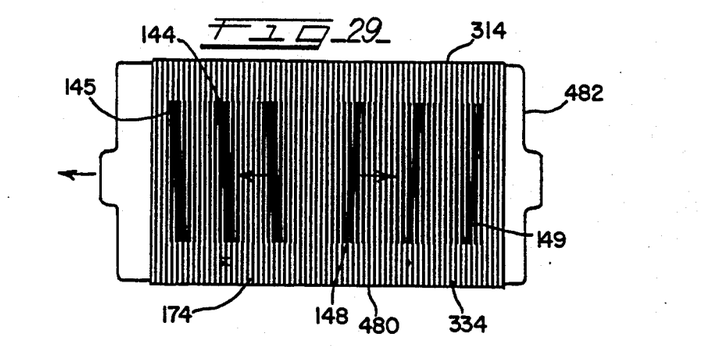
FIGS. 29 and 30 illustrate images appearing to move in the same and opposite directions as the underlying rearward web.
Figure 30:
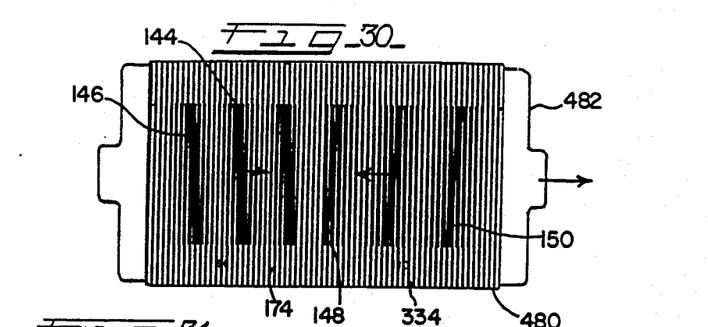

As shown in FIGS. 29 and 30, by varying (enlarging or decreasing) the spacing of the stripes of the images relative to the bars of the grid and laterally moving the front web 480 and/or the rearward web 482, the images can appear to move concurrently in the same direction as the rearward web or the front web (grid) or countercurrent in the reverse direction of the rearward web or front web (grid). For example, the 90% image in the left of FIGS. 29 and 30 has vertical stripes which are smaller in width than the vertical bars of the 100% grid so that the stripes of the left image appear to move in the same direction of the underlying rearward web 482 when the rearward web is moved laterally (sideways) in a direction perpendicular or transverse to the vertical stripes and bar. The 110% image on the right of FIGS. 29 and 30 has vertical stripes which are larger (broader) in width than the vertical bars of the 100% grid so that the stripes of the right image appear to move in the same direction as the rearward web 482 when the rearward web is moved laterally in a direction perpendicular and transverse to the vertical stripes and bars.

The composite display packaging 106 of FIGS. 27 and 28 comprises a flexible wrapper 500 (FIG. 25) and a slidable open ended, tubular cover 502 (FIG. 26). The wrapper 500 can be made of paper and coated with a glossy material, such as silicone. The wrapper 500 provides an inner containment member and shell to wrap and enclose one or more items, such as a candy bar or pieces of candy. When folded and wrapped around the candy, the wrapper has an elongated rectangular, top surface 504 (FIG. 25), an elongated rectangular, bottom surface 506, rectangular sides 508 and 510, and rectangular ends 512 and 514. A semi-rigid box or carton can be used in lieu of the wrapper to enclose more candy or items, or to enclose larger items. The open ended tubular cover 502 can be made of flexible and semi-rigid transparent plastic, such as polyethylene or polypropylene. The cover 502 provide an outer sleeve which snugly fits around, peripherally encloses, and can laterally slide upon the top and bottom surfaces 504 and 506 and sides 508 and 510 of the inner containment member (wrapper) 500. The open ended outer sleeve 502 (FIG. 26) has an elongated rectangular top 512, an elongated rectangular bottom (underside) 514, and rectangular sides 516 and 518.

The top 512 of the outer sleeve and cover 502 (FIG. 26) provides a front web. The front web 502 has a grid-like pattern or grid 168 with vertical bars 308 (as view from above the top) and spaces providing transparent windows 328 between the bars 308. The sides 516 and 518 of the cover can optionally have upright bars and windows.

The top surface 504 of the inner containment member (wrapper) 500 (FIG. 25) provides a rearward back web with superimposed images 130 thereon, including a first Good Stuff image 131 with vertical stripes 431 as viewed from above the top and a second Good Stuff image 132 with vertical stripes 432. The grid 168 (FIG. 26) and images 130–132 are preferable made in the manner previously described. When the cover (sleeve) 502 is slid along the inner containment member (wrapper) 500, such as when the cover is being removed, to unwrap the wrapper, the images 131 and 132 have the illusion of moving. For example, in the first image 131 of FIG. 27, the left O is down and the right O is up. In the second image 132 of FIG. 28, the left O is up and the right O is down, so that the double OO has the appearance of googily eyes.

Figure 20:
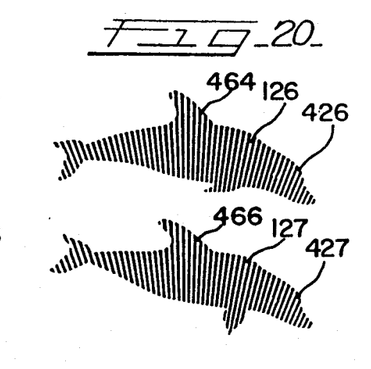
FIG. 20 illustrates two masked striped dolphin images.
Figure 21:
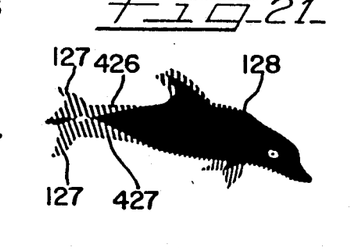
FIG. 21 illustrates two superimposed (combined) dolphin images.

The rotatable display 104 of FIGS. 23 and 24 has a stationary transparent plastic front web 520 and a rotatable disc or wheel 522 providing a rotatable rearward (back) web. The front web 520 (FIGS. 22-24) has a radial grid 166 with radial bars 306 and radial spaces providing transparent windows 326 between the bars 306. The rearward web 522 has superimposed dolphin images 128 (FIG. 21). The superimposed images 128 can include a first radially striped, dolphin image 126 as shown in FIG. 20 with radial stripes 426 and radial spaces 464 between the stripes 426 and a second radially striped, dolphin image 127 as shown in FIG. 20, with radial stripes 427 and radial spaces 466 between the stripes. A substantial portion of the stripes 426 of the first image 126 are aligned in registration and positioned in spaces 466 of the second image 127, and a substantial portion of the stripes 427 of the second image 127 are aligned in registration and positioned in spaces 464 of the first image 126 in the superimposed image 128 of FIG. 21. The grid and images are preferably made in the manner previously described. When the disc or wheel comprising the rearward web 522 (FIGS. 23 and 24) is rotated or pivoted, the images 126 and 127 have the illusion of moving. For example, in the first image 126 of FIG. 23, the tail of the dolphin is pointed down and the front lower flipper is pointed rearwardly. In the second image 127 of FIG. 24, the tail of the dolphin is moved upwardly and the front lower flipper is pointed downwardly.

Figures 1, 2:
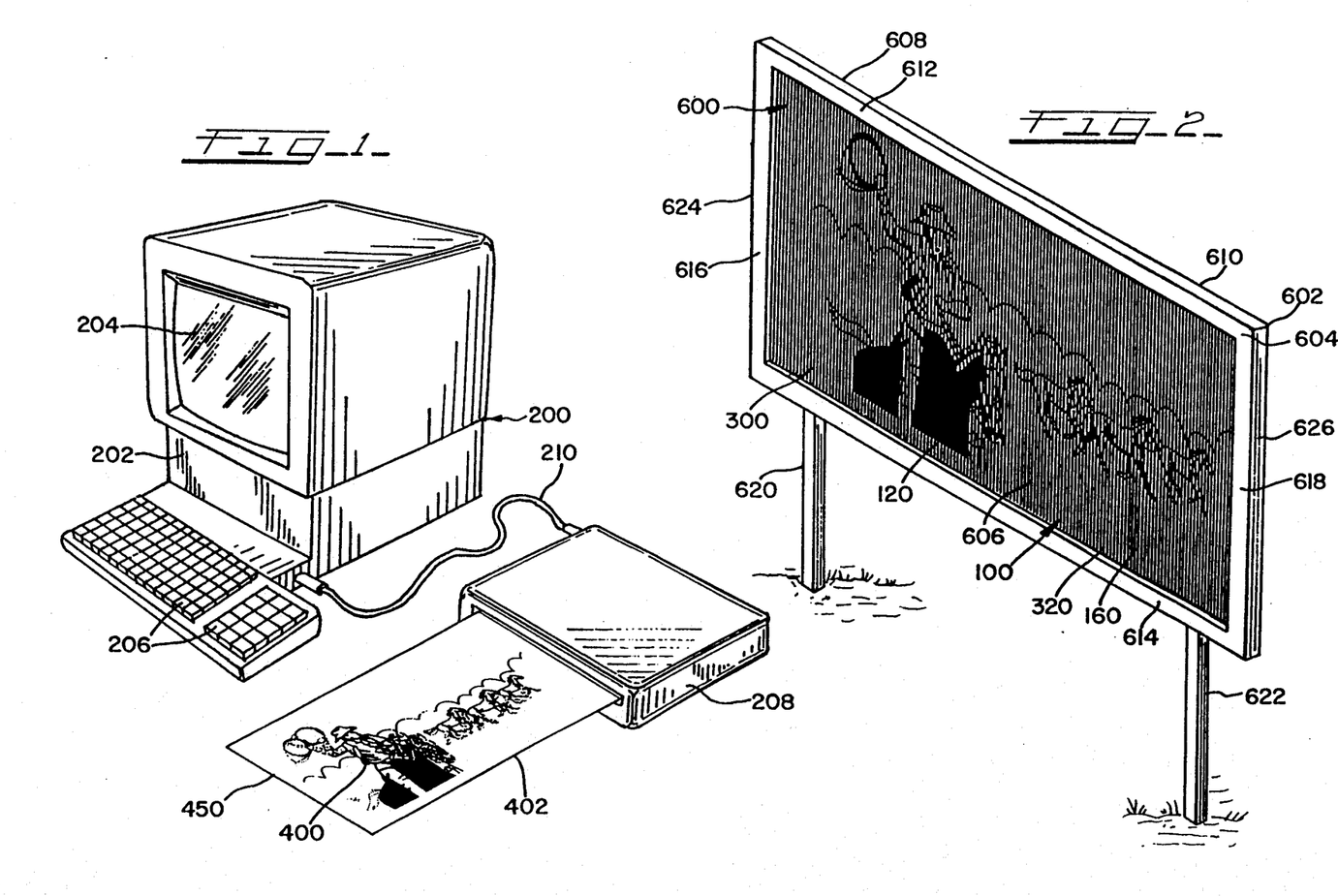
FIG. 1 is a perspective view of a central processing unit and optical scanner for producing a display in accordance with principles of the present invention.
FIG. 2 is a perspective view of a display sign in accordance with principles of the present invention.

The advertising display sign 100 of FIG. 2 comprises a sign assembly and billboard 600 with a rectangular frame assembly 602. The display sign 100 is useful to display and convey advertising, marketing, promotional, educational, or governmental information. The frame assembly 602 can include a rectangular front frame 604 which peripherally surrounds and is fixedly secured to the front, planar or flat, rectangular, rigid, stationary web 606 of the billboard 600. The frame assembly 602 can also include a rectangular rearward back frame 608 which peripherally surrounds and is fixedly secured to the rearward, planar or flat, rectangular, rigid, stationary underlying back web 610 of the billboard 600. Each frame can have a top elongated longitudinal horizontal beam 612, a bottom elongated longitudinal horizontal beam 614, a left upright side strut 616, and a right upright side strut 618. The upright struts 616 and 618 extend vertically between and connect the horizontal beams 612 and 614. One or more upright posts 620 and 622 or vertical columns are connected to the bottom beam 614 and provide a stand to elevate the billboard above the ground. Upright side walls 624 and 626 providing connecting members can extend between and connect the front and rear frames 604 and 608. In some circumstances, it may be desirable for the display sign to have a platform, scaffolding, braces, and/or back lit flood lights, as well as omit part or all of the back frame and side wall connecting members. If a single post is desired, it can be connected to the middle portion of the lower horizontal beam or cantilevered to a side section of the lower horizontal beam. Only one front web and one rear web is required, if the sign is mounted parallel to the traffic flow. If it is desired that the sign be positioned perpendicular or transverse to the traffic flow and that the sign display information in both opposing direction of traffic, then dual opposing front and rear webs can be used such as with a V-shaped frame assembly.

Figure 3:
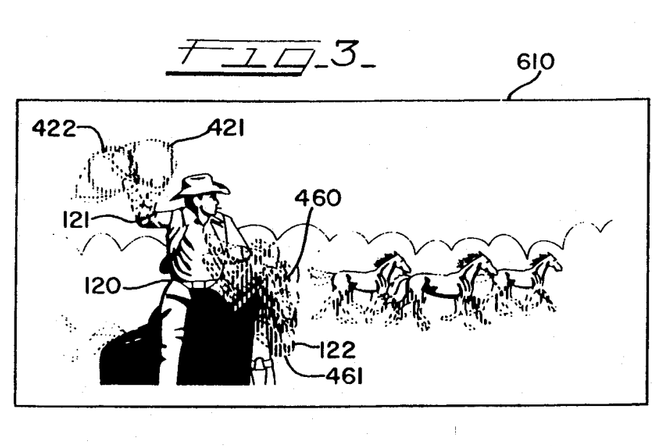
FIG. 3 is a front view of the rearward web, providing a backing sheet with underlying images, of the display sign.
Figure 4:
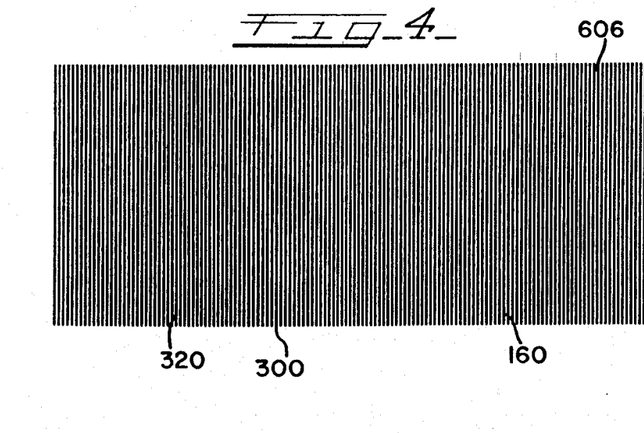
FIG. 4 is a front view of the front web (overlay) of the displays sign.
Figure 5:
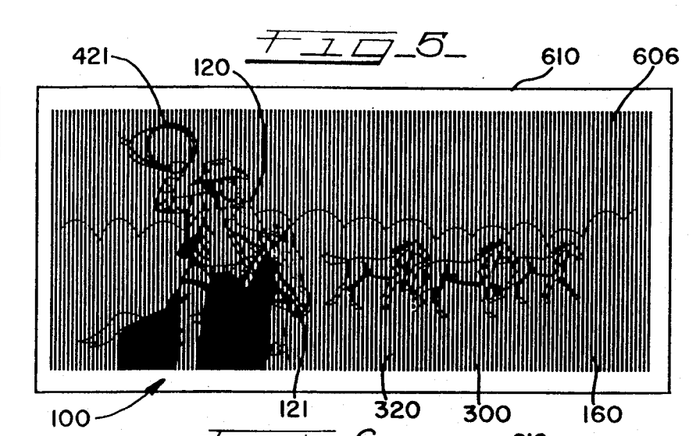
FIG. 5 is a front view of the display sign, with the front web placed in front of the rearward web, and illustrating the first image.

As shown in FIGS. 2 and 4, the front web 606 of the display sign 100 has a grid-like pattern providing a grid 160 with vertical bars 300 and slit-like spaces providing vertical transparent windows 320 between the bars. If solid rigid metal bars are preferred, the side struts of the front frame may be omitted, if desired. As best shown in FIG. 3, the rearward web 604 of the display sign 100 has offset superimposed images 120 including a first image 121 with stripes 421 and spaces 460, between the stripes 421, and a second image 122 with stripes 422 with spaces 461, between the stripes 422. The illustrated images are of a cowboy, a rope providing a lasso or lariat, and horses. A substantial portion of the stripes 422 of the first image are aligned in registration and positioned in spaces 461 of the second image 122, and a substantial portion of the stripes 422 of the second image 122 are aligned in registration and positioned in spaces 460 of the first image 121, in the superimposed image 120. The grid 160 and images 120–122 are preferably made in the manner previously described.

Figure 6:
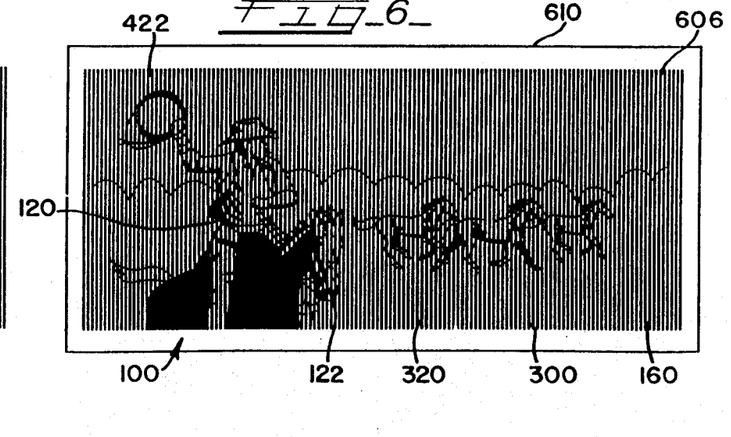
FIG. 6 is a front view of the display sign, with the front web placed in front of the rearward web, and illustrating the second image.
Figure 7:
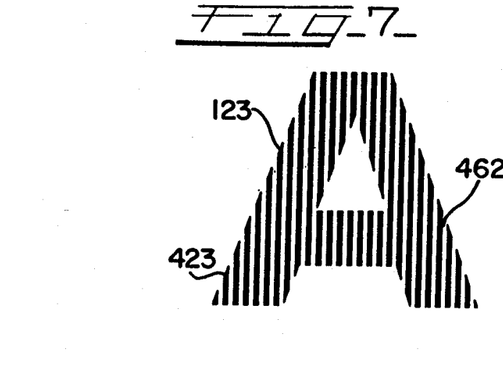
FIG. 7 is a masked image (object) of an A.

In use, when a pedestrian or other observer moves his head or changes locations, the images of the display sign 100 have the illusion of moving. For example, in FIG. 5, the cowboy's upright arm and lasso is cocked or tilted towards his head. In FIG. 6, the cowboy's upright arm and lasso have moved left and laterally outwardly away from the cowboy's head, the head of the horse the cowboy is riding is lower and the bigger horse's tail is higher than in FIG. 5, and the feet of the smaller horses in the background have changed position, to give the illusion of galloping horses.

The educational display game and toy 116 of FIGS. 38 and 39 has a rectangular frame assembly 700 providing a housing 702 which peripherally surrounds and is fixedly secured to a stationary front rectangular web 704. The housing 702 has front wall portions 706 providing the front of the housing which comprises a generally rectangular, removable front frame 708. The front frame 708 has horizontal (longitudinal) and vertical (lateral) sections 710-713 as viewed from above the front of the educational display game. The housing 702 has a back 714 which provides the back of the housing. The housing 702 also has transverse rectangular walls including horizontal side walls 716 and 718 and vertical end walls 720 and 722, which extend between and connect and are perpendicular to the back wall 714 and front 706 of the housing 702. Sets of latches 724 and 726 are connected to the side walls 716 and 718 to latch and detachably secure the side walls to the front 706 of the housing 702.

Manually grippable rotatable, control knobs 728 and 730 extend outwardly and downwardly from the lower bottom end wall 718 of the housing 702, as shown in FIGS. 38 and 39. Scrolls 732 and 734 comprising elongated parallel upright, tubular cylindrical rollers, cylindrical bars or cylinders 736 and 738 can be provided with slots or fasteners to securely grasp and hold a rearward rotatable, scrollable, flexible, moveable, back web 740. The scrolls 732 and 734 have slots or slotted teeth 742 and 744 which receive, are operatively connected to, and driven by drive teeth or lugs 746 and 748 of the control knobs 728 and 730, respectively. The scrolls (rollers) 732 and 734 and knobs 728 and 730 provide a scroll assembly, which operatively connected to the housing 702, to rotatively move the rearward web 726. The scrolls 732 and 734 are positioned within the interior of the housing 702.

In operation one of the scrolls, such 723, of the educational display game 116 (FIGS. 38 and 39) provides a lead roller or lead scroll and its associated knob, such as 728, provides a lead advance mechanism, while the other scroll, such as 734, provides a trailing roller or trailing scroll and its associated knob, such as 730, provides a trailing mechanism, or vice versa. When the lead mechanism (knob) 728 is rotated in one direction, such as counterclockwise, the lead roller 732 rotates in the same direction and rotatively moves, advances, and winds the rearward web 740. The trailing mechanism (knob) 730 and trailing roller 734 can move (follow) in the same direction as the lead mechanism (knob) 728 and lead roller 732. When the trailing mechanism (knob) 730 is rotated in the opposite direction, such as in a clockwise direction, the trailing roller (scroll) 734 rotates in the same direction as the trailing knob 728, to rotatively move, retract, and crank the rearward web 740 in the same clockwise direction. The other knob 728 and scroll 732 can follow (move) in the same clockwise direction. In some circumstances, it may be desirable to use cranks or other types of handles instead of knobs or it may be desirable to position the game horizontally or at an angle of inclination instead of vertically.

As shown in FIGS. 38 and 39, the front web 704 of the educational display game 116 has a grid-like pattern providing a grid 76 with vertical bars 316, as viewed from above the top of the display game, and slit-like spaces providing vertical transparent windows 336 between the bars. The rearward (back) web 740 has offset superimposed images 152 including first images 153 with stripes 453 and spaces, between the stripes 453, and second images 154 with stripes 454 and spaces between the stripes 454. The illustrated images are of a banana, balloon, and butterfly. The stripes 453 of the first images 153 are aligned in registration and positioned in the spaces of the second images 154, and the stripes 454 of the second images 154 are aligned in registration and positioned in the spaces of the first images 153, in the superimposed images 152. The grid 176 and images 152-154 are preferably made in the manner previously described.

In use, when the knobs 728 and 730 are turned, pivoted, or rotated, either clockwise or counterclockwise, the rear web 740 will move behind the stationary front web 704, and the images have the illusion of moving. For example, in FIG. 38, the head (banana peel) of the banana is open, the left arm is stretched general horizontally, and the wings of the butterfly are fully open. In FIG. 39, the head (banana peel) of the banana is closed, the left arm is raised, the wings of the butterfly are almost closed, and the balloon has moved higher and closer to the banana than in the other FIG. 38.

Figure 40:
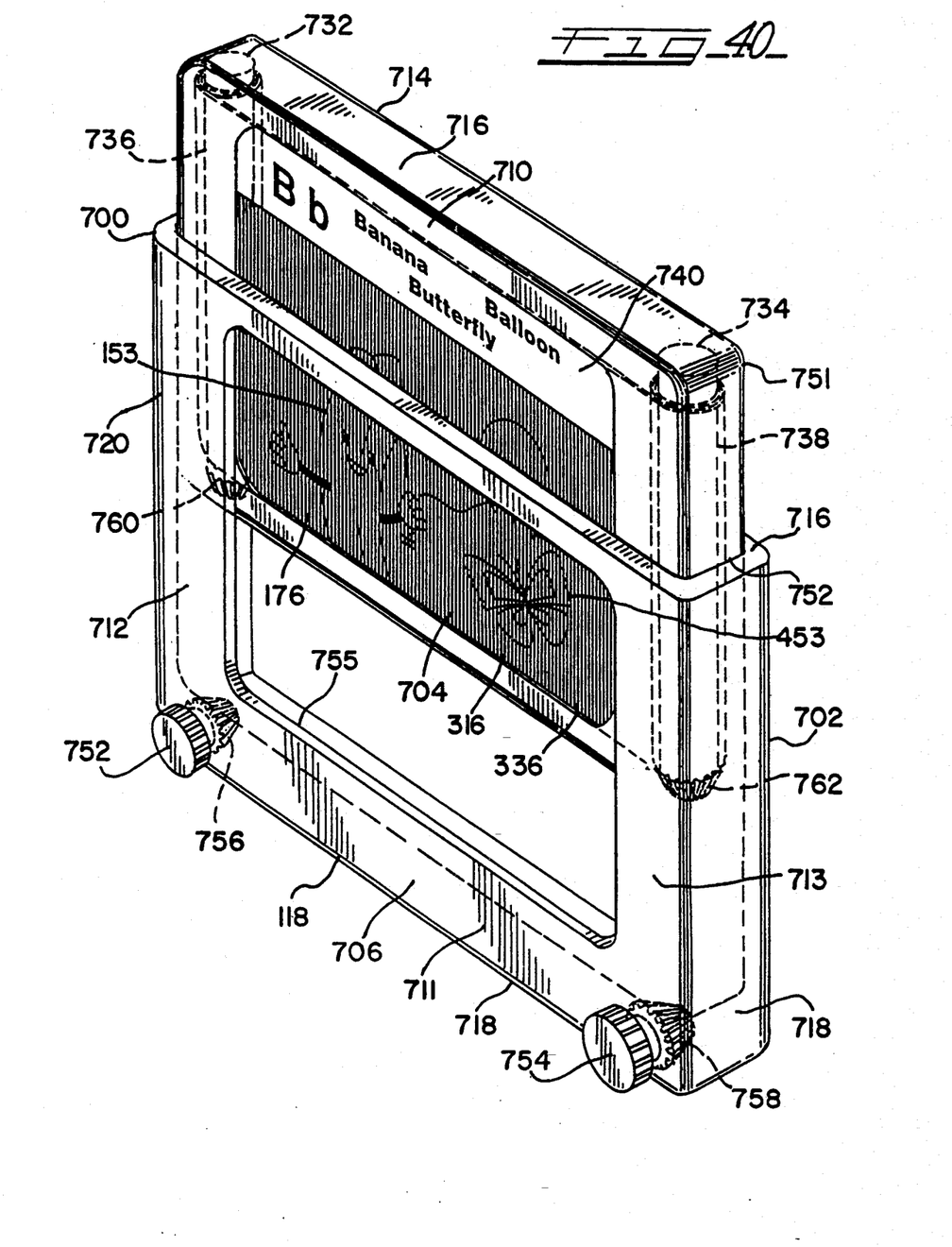
FIG. 40 is a perspective view of an educational display game with a removable cassette in accordance with principles of the present invention.

The educational display game and toy 118 of FIG. 40 is functionally and structurally similar to the educational game and toy 116 of FIGS. 38 and 39, except that the scrolls 732 and 734 and rearward web 74026 are housed, enclosed, and contained in a removable cassette or cartridge 750, the upper side 716 is open to define a rectangular slot 751 to slidably receive the cassette 750, and the knobs 752 and 754 extend outwardly from the frame 708. The front 706 of the housing 702 has a rectangular opening 755 for viewing of the grid 176 of the front web 706 as well as the rearward back web 740. The inner (inwardly facing) ends of the knobs 728 and 730 can have teeth 756 and 758 or comprise level gears to engage and drive corresponding teeth 760 and 762 or gears connected to the lower ends of the scrolls 722 and 724 when the cassette 750 is properly positioned in the slot 752. The cassette (cartridge) can be replaced with other cassettes (cartridges) having different images or stories: thereon, so that many different images and stories can be displayed.

The display devices produced by the described process, provide an animation system in which animations appear as a result of movement of the overlay grid (front web), patterns or images (rearward web), and/or the observer. The display system comprises one or more grid overlays positioned upon, against, over, or partially attached to the rearward web comprising the underlying artwork, message, etc. Animation will occur, when the grid overlay is positioned against or very close to the rearward web comprising the underlying artwork (illustrations or other images) and the grid overlay or artwork is moved. Animation will also occur, when the overlay is placed apart, or partially attached to underlaying artwork, and the grid, underlaying artwork, or eye position of the observer is moved. Animation is caused by the overlay hiding and obstructing all or part of the view of the underlaying art work or message.

For repeated or stepped action, two or more artworks (images) can be sliced into pieces by means of hand work, conventional stripping, and/or preferably by the described computer technology. When one or more overlays are placed over the underlying combined images, the overlay(s) covers at least part of the underlaying images, allowing for the viewer to see only one of the two or more segments of the combined superimposed images. By moving the overlays or underlying graphics (images), or combination of the two, the viewer can see the next segment (image), while the previous segment (image) is hidden by the overlay, thereby creating an illusion of repeated, stepped action and animation.

In order to attain the illusion of movement, such as horizontal, vertical, rotating, radial, or irregular movement, the patterns (images) comprising the underlying artwork or message is interfered by from different directions, thus creating optical illusions known as moire. When the overlay (front web) and underlying images (rearward web) are placed without any space or very little space therebetween, the spacing between the stripes and bars have to correspond to cause repeated or stepped animation. Patterns on both need not be identical to create optical illusion or moire. In such situations, movement(s) of overlay(s) or underlaying element(s) or combination of both will cause animation, but movement of viewer's eye position alone can not create animation.

Grids can be vertical, horizontal, and/or at any angle. Lines can be straight, curved, and/or irregular. Preferably, the lines of the grids are evenly spaced in case the movement of any images is straight (linear). When the movement is not straight (linear), such as curved or rotating, the lines of the grid may not be parallel to each other and the spacing may be uneven. The grid can be of different sizes, spacing, or at different angles, and movements can be forward, backward, upward, downward, or in any direction, as desired by the designer. At any given pattern, the lines of the grid are substantially parallel to each other and at equal intervals and spacing when the movement is straight. Generally, the overlay grid precisely covers at least one combined pattern at a time.

When different formulations on either overlays or the underlying images are not identical to each other, many movements will be created, such as vertical, horizontal, angular, rotating, radial, curved, etc. Movement of the images is controlled by the direction, speed, and angle of movement of the webs and by the thickness, spacing, shape, and angle of the bars on the grid.

Overlays and underlying back webs are preferably flat or planar, but they can be bent, curved, cylindrical or any combination of the above.

When the overlay (front web) and underlying element (rearward web) are spaced apart from each other, or partially attached to each other, the physical size of the overlay grid should be smaller than that of the underlying elements (superimposed images), since the overlay is closer to the viewer and overlaps and show one element (image) at a time to cause repeated and stepped animation. In this case, movement of the front web, rearward web, and/or viewer's position. The display sign of this invention can create the illusion of movement and animation without any moving parts, by varying the viewer's position.

For complex objects created which contain many colors, different drawing techniques such as masking, blending, patterning, can be used. The mask can have the appearance of a comb or a brush, and enables the designer or operator to mask out and eliminate parts of the objects (image) which are located in the void spaces of the masking pattern, thereby creating masked images which are spliced and spaced into pieces. Masking pattern can be in any shape, such as curved and/or, straight, as long as the lines conform and correspond to the the patterns on the overlay which will affect movement.

For a simple object with few colors, the designer can achieve the same results by first creating objects which conform the pattern on the overlay, then masking the object with the pattern which has an outline shape of the finished masked object. In this case, the splicing has already been done, so by masking with the pattern, any object outside of the pattern will be eliminated, thereby forming the masked objects.

Two masked objects can be overlapped, one right over the other very precisely, in a position so that one masked object is located in the void areas of the other object. The combined objects comprise two or more images in which the image alternate by one unit of the grid pattern.

The grid pattern placed on the combined objects (superimposed images), hides one object while showing the other object. Moving the overlay grid and/or underlying web, will create illusion of repeated and/or directional animation.

It is possible to create images combining three or more objects to perform three or more stepped motions. For three step animation, three objects are combined in the same manner described above, except void parts of a masked objects (images) are twice as wide, so two other images will be positioned into these void spaces. In such circumstances, the overlaying grid has lines (bars) twice as thick as the spaces between them, exposing one image at a time while hiding the other two images.

Four or more stepped movements are possible by increasing the numbers of objects (images) and thickness of the lines (bars) on the overlay grids.

When the grid is placed over the combined superimposed offset image, it hides all but one of the underlying images. By moving the grid, graphic or eye by one unit, the other unit of the graphic will appear while hiding the other images at the same time. The combined graphics can provide one or more repeated motions.

The overlay grid can be placed right on the graphic. In this case, the shape and spacing of the grid pattern on both the graphic and overlay exactly match. In such circumstances, animation is caused by either movement of the graphic, overlay, or combinations of the above, and movement of viewpoint alone typically will not cause animation.

When the overlay grid is placed away from the graphic, movement of either the graphic, overlay grid, location (viewpoint) of the observer, or any combination of the above, will cause animation. Even when the graphic and overlay grid are placed against each other, movement of the viewpoint will cause animation. Such animation will also occur, when the display is placed on moving vehicles and objects, such as buses, trains, elevators, etc.

Spacing of the pattern lines on the overlay grid should be smaller than that of the graphic because the overlay grid is closer to the observer (viewpoint). The distance between the overlay grid and the graphic (rearward web) can be dependent upon the distance to the observer (viewpoint) or focal point.

If desired, the space between the graphic (rearward web) and the overlay grid (front web) can be filled with transparent materials, such as transparent acrylic or other plastic, glass, etc.

By increasing the number of units of the grid line width compared to the space (3, 4, 5, etc.), animation steps can be increased (3, 4, 5, etc.). The more animation steps desired, however, the more portions of the graphic will be obstructed during viewing of other portions of the graphic.

The display can be used in display signs, paintings, sculptures, back lit transparencies, advertisements, countertop displays, packaging, billboards, posters, toys, educational games, books, magazines, promotional publications, murals, stores, and other applications where animations are effective or desirable.

Among the many advantages of the novel display and process are:
1. Outstanding marketing, advertising, and promotional appeals.
2. Excellent ability to interestingly disseminate educational, safety, medical, and government information.
3. Superior product.
4. Superb quality.
5. Impressive.
6. Cost effective.
7. Simple to install.
8. Easy to use.
9. Economical.
10. Attractive.
11. Efficient.
12. Effective.

Although embodiments of the invention has been shown and described, it is to be understood that various modifications and substitutions, as well as rearrangements of parts, components, and process steps, can be made by those skilled in the art without departing from the novel spirit and scope of this invention.

What is claimed is:

1. A display, comprising:
a sign for advertising and displaying information;
said sign having a billboard comprising a substantially planar and rectangular stationary rearward web, a substantially stationary front web spaced in front of and substantially parallel to said rearward web, a frame assembly having a front frame section with substantially horizontal top and bottom beams fixedly secured to said front web, and at least one upright post connected to said bottom beam for elevating said webs above the ground;
said rearward web having first and second superimposed striped images thereon;
said front web comprising a substantially transparent viewable portion with a set of aliquot slit-like spaces providing a series of substantially rectangular transparent windows for viewing only said first superimposed images from first angular position and for viewing only said second superimposed images from a second angular position, and said grid-like pattern comprising a set of aliquot spaced opaque bars with substantially rectangular portions positioned between said rectangular windows for substantially blocking the view of said second superimposed image from said first angular position and for substantially blocking the view of said first superimposed image from said second angular position;
said first superimposed image on said rearward web having viewable first opaque portions and substantially rectangular obstructed invisible first spacer portions, said viewable first opaque portions comprising an array of aliquot spaced substantially rectangular first strips with first indicia thereon comprising some of said information, said first strips having a width less than said windows and being aligned in registration with said windows for viewing in said first angular position, and said first spacer portions spanning a width less than said bars and being substantially obstructed and blocked from view by said bars in said first angular position;
said second superimposed image on said rearward web having viewable second opaque portions and substantially rectangular obstructed second spacer portions, said viewable second opaque portions comprising an array of aliquot spaced substantially rectangular second strips with second indicia thereon comprising some of said information, said second strips having a width less than said windows and being aligned in registration with said windows for viewing in said second angular position, and said second spacer portions spanning a width less than said bars and being substantially obstructed and blocked from view by said bars in said second angular position; and
at least a portion said first opaque strips of said first superimposed image being positioned in at least a part of said second spacer portions of said second superimposed image on said rearward web, and at least a part of said second opaque strips of said second superimposed image being positioned in said at least a part of said first spacer portions of said first superimposed image or said rearward web.

2. A display in accordance with claim 1 wherein:
said frame assembly comprises
a substantially rectangular front frame peripherally surrounding and connected to said front web,
a substantially rectangular rearward frame peripherally surrounding and connected to said rearward web, and
upright side walls providing connecting members for conecting said front and rearward frames; and
the relationship of the width of the bars of the grid, the width of the stripes of the superimposed images, and the spacing between the front web and the rearward web, to a focal point of an observer, are in accordance with the following formulas:

$$S = B - D \text{ and}$$

$$A/B = C/D$$

wherein
$S$ = the spacing between the front web and the rearward web
$B$ = the distance between the rearward web and a focal point of the observer
$D$ = the distance between the front web and the focal point of the observer
$A$ = maximum width of any stripe of the images
$C$ = maximum width of any bar of the grid.

3. A display, comprising:
an educational game for displaying information;
said educational game comprising a substantially planar and rectangular stationary front web, a substantially rectangular frame assembly providing a housing surrounding and fixedly secured to said front web, a flexible moveable rearward web spaced rearwardly and below said front web within the interior of said housing, and a scroll assembly operatively connected to said housing for rotatively moving said rearward web;

said frame assembly having substantially rectangular front wall portions peripherally connected to and positioned about said stationary front web, a back wall, and transverse walls extending between and connected to said back wall and said front wall portions;

said scroll assembly comprising elongated substantially cylindrical rollers operatively positioned in said housing, said rollers including a lead roller rotatively connected to said rearward web for rotatively moving, advancing, and winding said moveable rearward web in one direction and a trailing roller positioned substantially parallel to said lead roller for rotatively moving, retracting, and cranking said moveable rearward web in an opposite direction, a lead advance mechanism operatively connected to said lead roller for rotating said lead roller, a trailing mechanism operatively connected to said trailing roller for rotating said trailing roller, said mechanism comprising a manually grippable handle selected from the group consisting of a crank and a knob;

said rearward web having first and second superimposed striped images thereon;

said front web comprising a substantially transparent viewable portion with a set of aliquot slit-like spaces providing a series of substantially rectangular transparent windows for viewing only said first superimposed images from first angular position and for viewing only said second superimposed images from a second angular position, and said grid-like pattern comprising a set of aliquot spaced opaque bars with substantially rectangular portions positioned between said rectangular windows for substantially blocking the view of said second superimposed image from said first angular position and for substantially blocking the view of said first superimposed image from said second angular position;

said first superimposed image on said rearward web having viewable first opaque portions and substantially rectangular obstructed invisible first spacer portions, said viewable first opaque portions comprising an array of aliquot spaced substantially rectangular first strips with first indicia thereon comprising some of said information, said first strips having a width less than said windows and being aligned in registration with said windows for viewing in said first angular position, and said first spacer portions spanning a width less than said bars and being substantially obstructed and blocked from view by said bars in said first angular position;

said second superimposed image on said rearward web having viewable second opaque portions and substantially rectangular obstructed second spacer portions, said viewable second opaque portions comprising an array of aliquot spaced substantially rectangular second strips with second indicia thereon comprising some of said information, said second strips having a width less than said windows and being aligned in registration with said windows for viewing in said second angular position, and said second spacer portions spanning a width less than said bars and being substantially obstructed and blocked from view by said bars in said second angular position; and at least a portion said first opaque strips of said first superimposed image being positioned in at least a part of said second spacer portions of said second superimposed image on said rearward web, and at least a part of said second opaque strips of said second superimposed image being positioned in said at least a part of said first spacer portions of said first superimposed image or said rearward web.

4. A display in accordance with claim 3 including a removable cassette for substantially containing said rollers and said rearward web; and said housing defines a slot for slidably receiving said cassette.

* * * * *